United States Patent [19]
Tolendano

[11] Patent Number: 5,485,921
[45] Date of Patent: Jan. 23, 1996

[54] LUNCH BOX

[75] Inventor: Jacob M. Tolendano, Great Neck, N.Y.

[73] Assignee: Aristo International Corporation, New York, N.Y.

[21] Appl. No.: 125,119

[22] Filed: Sep. 22, 1993

[51] Int. Cl.$^6$ .................................................. B65D 81/20
[52] U.S. Cl. ........................ 206/545; 206/524.8; 206/541
[58] Field of Search .................................... 206/541, 545, 206/524.8

[56] References Cited

U.S. PATENT DOCUMENTS

| | | | |
|---|---|---|---|
| 2,239,128 | 4/1941 | Sykes | 206/545 X |
| 2,890,810 | 6/1959 | Rohling | 206/524.8 X |
| 3,943,987 | 3/1976 | Rossi | 206/524.8 |
| 4,373,636 | 2/1983 | Hoffman | 206/545 X |
| 4,570,800 | 2/1986 | Luckett | 206/545 |
| 4,630,671 | 12/1986 | Sherman et al. | 206/545 X |
| 4,830,190 | 5/1989 | Inagaki | 206/545 X |
| 4,969,558 | 11/1990 | Fisher | 206/545 X |
| 5,007,743 | 4/1991 | Brennan | 206/545 X |
| 5,052,369 | 10/1991 | Johnson | 206/545 X |
| 5,082,115 | 1/1992 | Hutcheson | 206/545 |
| 5,259,506 | 11/1993 | Pascale et al. | 206/545 |

FOREIGN PATENT DOCUMENTS 3508436  9/1986  Germany ................................ 206/541

Primary Examiner—Jimmy G. Foster
Attorney, Agent, or Firm—Ostrolenk, Faber, Gerb & Soffen

[57] ABSTRACT

A lunch box has a housing defining a hot and a cold compartment. An arrangement is provided in the lunch box for creating vacuum inside the compartments so as to releasably seal the cover of the lunch box onto the housing. Ribs or protrusions are provided on inner surfaces of the compartments to substantially prevent contact between stored food and the inner surfaces of the compartments. A device for producing heat may be provided in the hot compartment. Vacuum created inside the lunch box and minimal contact between the stored food and surfaces of the compartments substantially eliminates convection and conduction of heat to and from the stored food thereby effectively maintaining the temperature of the stored food over longer periods of time.

9 Claims, 1 Drawing Sheet

U.S. Patent
Jan. 23, 1996
5,485,921
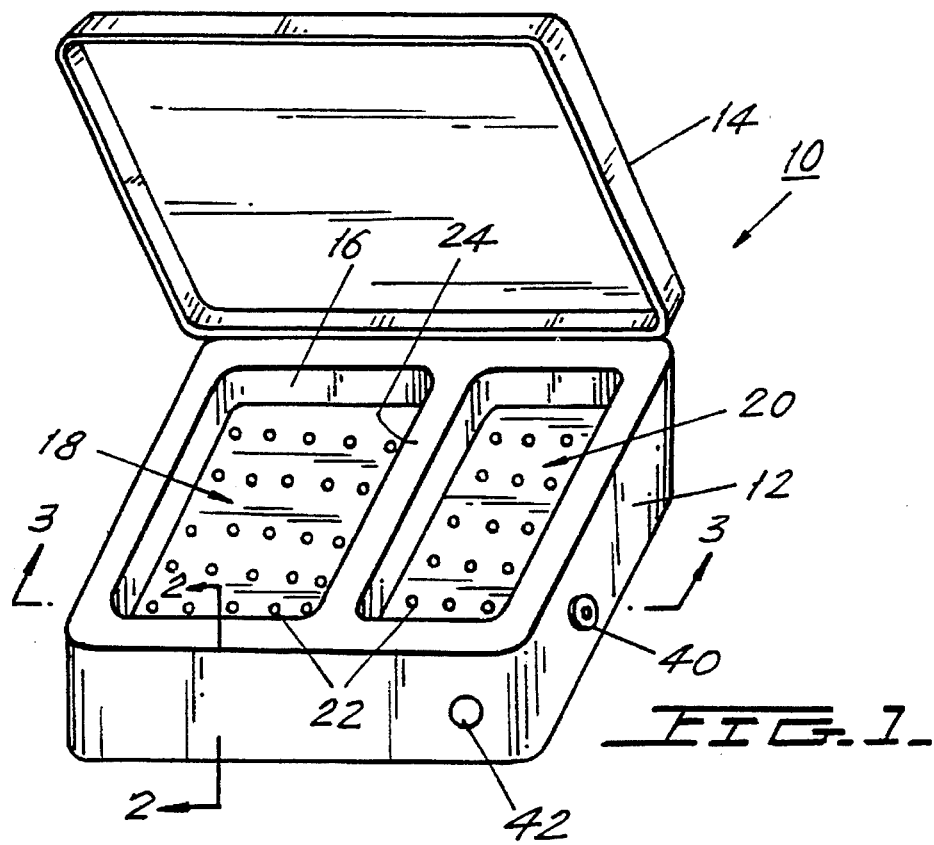
FIG. 1.
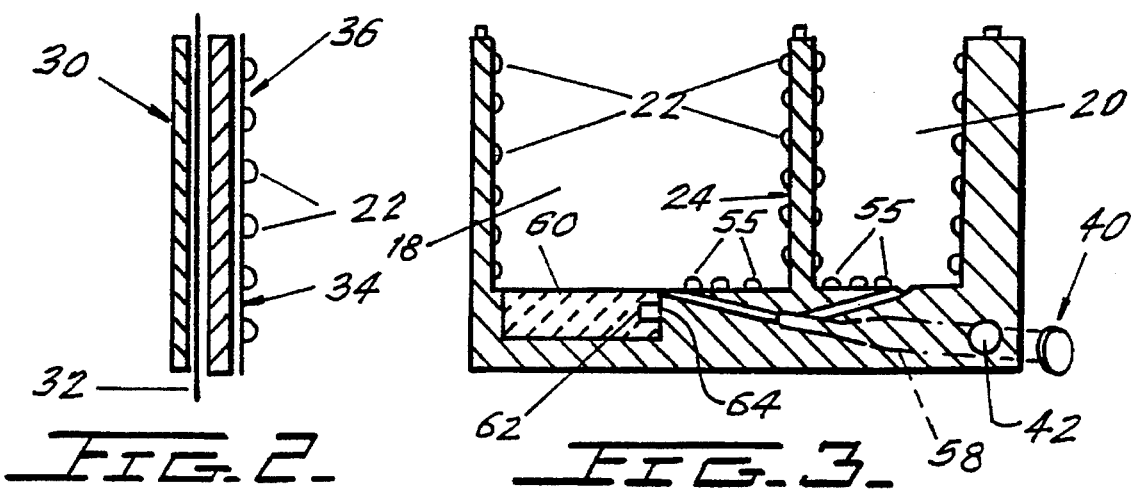
FIG. 2.
FIG. 3.
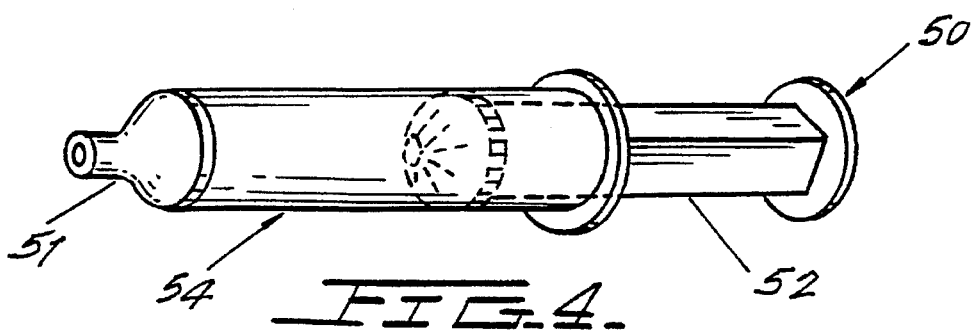
FIG. 4.

5,485,921

1

LUNCH BOX

BACKGROUND OF THE INVENTION

The present invention relates to an insulated lunch box for storing hot and cold food so as to maintain the temperature of the stored food over extended periods of time.

Lunch boxes are used to store food for consumption after a period of time. Insulated lunch boxes are especially useful for storing food which must be kept hot or cold for improved taste and possibly to prevent spoilage. Generally, a lunch box is a container with a number of chambers, receptacles or trays for carrying different foods which are to be stored at different temperatures and/or which are to be eaten at different temperatures, some hot and some cold. It is also known to provide heating and cooling devices in parts of the lunch box for heating or cooling some of the stored foods for greater enjoyment.

A number of lunch boxes, are shown in, for example, U.S. Pat. Nos. 5,082,115; 5,052,369; 5,007,743; and 4,830,190. However, the lunch boxes disclosed in the prior art suffer from the problem that food which is to be kept either hot or cold inside the lunch box cannot be maintained at the appropriate temperature for four or more hours because air, which is trapped inside the lunch box, allows convection of heat to or from the stored food. Moreover, in the prior art lunch boxes, there usually is wide spread contact between the stored food and inner surfaces of the lunch box. Such contact can be direct or through a container in which the food is placed. This contact between hot or cold food stored inside the lunch box and inner surfaces of the lunch box facilitates transfer/conduction of heat to or from the food thereby making it more difficult to maintain the food at a desired temperature over an extended period of time. The food, therefore, loses taste and could even spoil. Therefore, there is a need for a lunch box which more effectively preserves food stored in it by maintaining the temperature of the food at an optimal temperature range over a period from early morning to lunch time.

SUMMARY OF THE INVENTION

Accordingly, it is a primary object of the present invention to provide a lunch box which enables food to be eaten several hours after it has been placed in the lunch box.

It is another object of the present invention to provide a lunch box for maintaining the temperature of food stored in the lunch box over an extended period of time.

Another object of the present invention is to provide a lunch box having an arrangement for creating vacuum inside the lunch box in order to releasably secure a cover onto the housing of the lunch box, whereby the inside of the lunch box is maintained below atmospheric pressure. A consequence of the vacuum created inside the lunch is that convection of heat to and from food stored in the lunch box is substantially eliminated.

It is still another object of the present invention to provide a lunch box having ribs or other protrusions formed on at least portions of inner surfaces of the lunch box so as to substantially reduce, and/or entirely eliminate contact between the inner surfaces and food stored inside the lunch box. A consequence of minimizing contact between stored food and inner surfaces of the lunch box is that conduction of heat to and from food stored in the lunch box is substantially lessened.

Yet another object of the present invention is to provide a lunch box having a device for heating at a desired time the food stored therein.

These and other objects of the present invention are achieved by a lunch box comprising an external box housing defining within itself at least one compartment for storing food therein; the compartment having inner wall surfaces, means formed on at least a portion of the inner wall surfaces for substantially preventing contact between food stored in the compartment and the inner wall surfaces of the compartment; and a cover over the housing for enclosing the compartment, whereby transfer of heat between the stored food and the inner wall surfaces of the compartment is substantially eliminated.

In another aspect of the invention, a lunch box is provided comprising an external box housing defining within itself at least one compartment for storing food therein; a cover over the housing for enclosing the compartment; and vacuum creating means in the housing in fluid connection with the inside of the compartment for creating vacuum in the compartment, whereby a vacuum is created inside the compartment so as to releasably secure the cover to the housing and to maintain the inside of the compartment at a below atmospheric pressure.

Another aspect of the invention provides a lunch box comprising an external box housing defining within itself at least one compartment for storing food therein; the compartment for storing food having inner wall surfaces, means formed on at least a portion of the inner wall surfaces for substantially preventing contact between food stored in the compartment and the inner wall surfaces of the compartment; a cover over the housing for enclosing the compartment; and vacuum creating means in the housing in fluid connection with the inside of the compartment for creating vacuum in the compartment by evacuating substantially all of the air therein, whereby a vacuum is created inside the compartment so as to releasably secure the cover to the housing and to maintain the inside of the compartment at a lower ambient pressure than normal.

In another aspect of the invention, a lunch box for maintaining the temperature of stored food is provided, comprising an external box housing defining within itself at least one compartment for storing food therein; means for producing heat provided in the compartment for initiating the production of heat at a desired time and trigger means for actuating the heat producing means to produce heat at the desired time; and a cover over the housing for enclosing the compartment, whereby hot food stored in the compartment is maintained hot when heat is produced by the means for producing heat.

In yet another aspect of the invention, a method is provided for preserving food stored in a lunch box by maintaining the temperature of the food. The method includes the steps of (a) providing a lunch box having an external box housing defining within itself at least one compartment for storing food therein, the compartment for storing food having inner wall surfaces, means formed on at least a portion of the inner wall surfaces for substantially preventing contact between food stored in the compartment and the inner wall surfaces of the compartment; a cover over the housing for enclosing the compartment; and vacuum creating means in the housing in fluid connection with the inside of the compartment for creating vacuum in the compartment; (b) storing food in the compartment; and (c) creating vacuum inside the compartment so as to releasably secure the cover to the housing, whereby the inside of the compartment is maintained below atmospheric pressure.

Other features and advantages of the present invention will become apparent from the following description of the invention which refers to the accompanying drawings.

BRIEF DESCRIPTION OF THE DRAWINGS

FIG. 1 is a perspective view of the lunch box of the present invention;

FIG. 2 is cross-sectional view of the lunch box along line 2—2 in FIG. 1;

FIG. 3 is cross-sectional view of the lunch box along line 3—3 of FIG. 1; and

FIG. 4 is a perspective view of the vacuum pump 50.

DESCRIPTION OF THE PREFERRED EMBODIMENTS

FIG. 1 shows a lunch box 10 having an external box housing 12. Inside the box 10 are a hot compartment 18 and unheated and therefore cool compartment 20. It is, however, not necessary to provide both compartments. For example, a single compartment may be provided that is used as a cool compartment or a hot compartment depending on whether the food stored in it is cold or hot.

A cover 14 is provided over the compartments 18 and 20. The cover 14 may be hinged to the housing 12 at the rear edge 16 so that the cover 14 can be closed over the compartments 18, 20. A carrying handle (not shown) may be provided at the top of the cover 14, or, the box 10 may have carrying straps.

Protrusions 22 are formed on inner surfaces of the compartments 18, 20. The protrusions 22 may be formed by any suitable method known in the art. For example, the protrusions 22 may be molded onto the surface of the material forming the inner surfaces of the compartments 18, 20. The protrusions 22 serve the function of substantially reducing contact of food that is stored in the compartments 18, 20 with the inner surfaces of the compartments 18, 20. Accordingly, the protrusions 22 may be of any suitable shape. For example, the protrusions 22 may be formed as continuous ribs, elevated spikes or small spheres. The protrusions 22 by substantially preventing the stored food from touching the inner wall surfaces of the compartments 18, 20 significantly reduce transfer/conduction of heat to and from the stored food. Stored food touches only pinpoint areas of the inner wall surfaces of the compartments 18, 20 thereby limiting the amount of heat conducted to or from the stored food. The protrusions 22 may be formed on all or on portions of the inner surfaces of the compartments 18, 20, such as on the inside of the bottom and side walls of the compartments 18, 20. The protrusions 22 may also be formed on the inner surface of the cover 14.

It has been found that ribs having height and spacing dimensions of about one inch were effective to maintain food over a period of over four hours at a temperature that meets governmental regulations. One range of spacings dimensions preferred by the inventor herein is from one half to about two inches between the ribs 22. Similar spacing may be provided if ribs or finger-like projections are used for the purpose of producing the virtually contactless interface between the food and the inner wall surfaces of the lunch box of the present invention.

An outlet 40, which has a unidirectional valve 43 (shown in FIG. 3) attached at the opening, is provided in the housing 12. A vacuum pump 50 (shown in FIG. 4) can be coupled to the opening of the outlet 40. A release valve 42 is also provided in the housing 12. The vacuum pump and the release valve 42, and their operation, is discussed below. The unidirectional valve 43 and the release valve 42 may be provided separately, as shown in FIG. 1. Alternatively, the unidirectional valve 43 and the release valve 42 may be combined into a single unit, which is attached to the opening of the outlet 40.

The outlet 40 has the unidirectional valve 43 attached to its opening so that air can flow out the opening of the outlet 40, but air cannot flow back through the opening of the outlet 40 in the other direction. Thus, air can be evacuated from the compartments 18, 20 (as further explained below) through the outlet 40 by the vacuum pump 50, but air cannot flow in the reverse direction through the opening of the outlet 40 back into the compartments 18, 20. The unidirectional valve 43 may be of a suitable type. Such valves are well known to persons skilled in the art and, therefore, will riot be discussed here.

FIG. 2, a cross-sectional view of the housing 12 along line 2–2 of FIG. 1, shows the structure of the housing 12 and the cover 14. Preferably, the housing 12 and the cover 14 may be formed of an outer shell 30, a first intermediate impermeable layer 32 made of a suitable material such as metal, mylar, etc., a second intermediate inner layer 34, and an inner shell 36 made of a suitable non-toxic material. The inner shell 36 preferably is made or lined with a heat reflecting surface, e.g. mylar or polished metal or metal coated plastic. The outer shell 30 may be made of, for example, plastic or metal. However, any appropriate material may be used to make the outer shell 30. The first intermediate impermeable layer 32 primarily functions to reflect radiations. Accordingly, the impermeable layer 32 may be made of a suitable material that reflects heat passing through the lunch box 10, such as polished metal or mylar. In a preferred embodiment, the impermeable layer 32 is a coating or lamination on the second intermediate inner layer 34.

The second intermediate inner layer 34 functions as an insulating layer. The second intermediate inner layer 34 may be made of a suitable insulation material, such as close-cell foam. Any suitable material that will provide the desired insulation may be used for the second intermediate inner layer 34. The inner shell 36 is preferably made of nontoxic material because of its proximity to food stored in the compartments 18, 20. The protrusions 22 may be formed on the inner shell 36 by a suitable method, as previously discussed above.

FIG. 3, a cross-sectional view of the housing 12 along line 3—3 of FIG. 1, shows a resilient seal 38 provided at a top rim of the housing 12. The resilient seal 38 may be made of a suitable material such as rubber or silicon material, and may be attached to the top rim of the housing 12 by adhesive or any other appropriate method. Alternatively, the resilient seal 38 may be attached to the inner surface of the cover 14.

In the arrangement shown in FIG. 3, the resilient seal 38 operates to engage the inside surface of the cover 14 when the cover 14 is secured onto the housing 12. The resilient seal 38 provides a tight seal between the top rim of the housing 12 and the inside surface of the cover 14 thereby sealing the inside of the lunch box 10 from the outer environment. The resilient seal 38 also functions so as to seal off the compartments 18, 20 from each other. The resilient seal 38 forms a tight seal between the inside surface of the cover 14 and the top of the wall 24 that separates the compartments 18, 20. Accordingly, heat is prevented from passing between the compartments 18, 20 from over the top of the wall 24.

As shown in FIG. 3, the outlet 40 and release valve 42 are connected with a tubular channel 58, which connects the opening of the outlet 40 and the release valve 42 with openings 55 provided in the compartments 18, 20. The tubular channel 58 may be provided in between the outer shell 30 and the inner shell 36, as shown in FIG. 3. The tubular channel 58 may be formed of a plastic tube having a circular bore, or of any other appropriate material or shape. The tubular channel 58 serves the function of providing a conduit for air to and from the compartments 18, 20.

As discussed above, the unidirectional valve 43 at the opening of the outlet 40 allows air from the compartments 18, 20 to flow out the opening of the outlet 40 but does not allow air to flow back through the opening of the outlet 40. The release valve 42, when operated, allows air to flow into the tubular channel 58, and from there into the compartments 18, 20 through the openings 55 provided in the compartments 18, 20.

The release valve 42 may be of any type known in the art. The purpose of the release valve 42 is to relieve the vacuum formed by the vacuum pump 50 inside the compartments 18, 20. As previously discussed above, the release valve 42 may be a separate unit, as shown in the preferred embodiment of FIG. 1, or the release valve 42 may be formed as a single unit with the unidirectional valve 43. Such arrangements are well known and, therefore, will not be discussed here.

FIG. 4 shows the vacuum pump 50 having a plunger 52 placed inside a barrel 54. The plunger 52 draws air from the compartments 18, 20 through the openings 55 provided in the compartments 18, 20 when the plunger 52 is moved to and fro inside the barrel 54 with a pumping motion. More specifically, the plunger 52 forms a vacuum in the barrel 54 when the plunger 52 is pulled outwardly in the barrel 54. The vacuum formed in the barrel 54 causes air in the tubular channel 58, and in the compartments 18, 20, to flow into the barrel 54. This air flowing into the barrel 54 is then evacuated from the barrel 54 by the next inwardly stroke of the plunger 52. By repeatedly pumping the plunger 52, most of the air in the compartments 18, 20 can be evacuated. Such vacuum pumps are well known and, therefore, will not be discussed here. The vacuum pump 50 may be made of any suitable material. In a preferred embodiment, the vacuum pump 50 is made of plastic. The vacuum pump 50 may be provided as a separate unit, as shown in the preferred embodiment of FIG. 4. Alternatively, a vacuum pump may be provided as an integral part of the lunch box 10. In the arrangement of the preferred embodiment of FIG. 4, the same vacuum pump 50 may be used in combination with multiple lunch boxes. Moreover, in such a vacuum pump, which is provided as a separate unit, parts of the vacuum pump 50 may be easily replaced, if necessary.

As shown in FIG. 4, an opening 51 is provided at one end of the barrel 54 of the vacuum pump 50. The opening 51 has a nozzle formed at its end. The nozzel is shaped so as to press-fit into the opening of the outlet 40, which is provided in the housing 12. Accordingly, the vacuum pump 50 can be connected to the opening of the outlet 40 in order to draw air from the compartments 18, 20 through the openings 55 and the tubular channel 58. The unidirection, valve 43, which is provided at the opening of the outlet 40, operates so that air is withdrawn from the compartments 18, 20, through the openings 55 and the tubular channel 58, when the plunger 52 of the vacuum pump 50 is moved outwardly in the barrel 54 but air cannot re-enter through the opening of the outlet 40 into the tubular channel 58 to return to the compartments 18, 20 when the plunger 52 is moved in the opposite direction. Moreover, the unidirectional valve 43 prevents air from entering through the opening of the outlet 40 after the vacuum pump 50 is removed from the outlet 40, as in the preferred embodiment of FIG. 1. Accordingly, vacuum is maintained in the compartments 18, 20 until the release valve 42 is operated. Therefore, once the cover 14 is placed on the housing 12 to enclose the compartments 18, 20, the only inlet available for air to enter the compartments 18, 20 is through the release valve 42.

By this arrangement vacuum can be created inside the compartments 18, 20 so that the storage space inside the compartments 18, 20 is at a lower atmospheric pressure than normal. The vacuum formed inside the compartments 18, 20 slows down convection of heat to and from food stored in the compartments 18, 20. This feature of the invention allows stored food to be maintained at an optimal temperature range for an extended period of time. The vacuum also causes the cover 14 to press down on the housing 12 because of the higher atmospheric pressure outside the cover 14 and, therefore, releasably secures the cover 14 onto the housing 12 until the vacuum inside the compartments 18, 20 is relieved by operating the release valve 42.

As shown in FIG. 3, a device for producing heat 60 may be provided in a cavity formed in the inner bottom wall of the compartment 18. The heat producing device 60 may be operatively connected to a trigger 62 and a timer 64. The heating device 60 may be of the type that stores heat until the trigger 62 actuates the heating device 60 to release the stored heat. The trigger 62 may preferably be a spring-actuated mechanism. The function of the trigger 62 is to provide an external stimulus to the heating device 60, as discussed below. Therefore, the trigger 62 may be any arrangement that achieves this function.

Heating devices, such as the heat producing device 60, are well known by persons skilled in the art. For example, devices made of sodium acetate packaged in a plastic container are commercially available. The sodium acetate heating device stores heat when heated in hot water or in a micro-wave oven. Such heating causes the sodium acetate to convert from a solid state to a liquid state. The sodium acetate remains in the liquid state and retains the heat until an external stimulus triggers the release of the stored heat. As the sodium acetate releases the stored heat it converts back to the solid state. Any type of a mechanical trigger may be provided for the trigger 62. Similarly, any known timing device may be provided for the timer 64 so that the trigger 62 may be activated after a predetermined period of time so as to actuate the heating device 60. For example, a timer may be provided to start the heating device 60 two hours after food is placed in the compartment 18. The heating device 60 serves the function of heating the environment in the compartment 18 so that hot food stored therein may be maintained hot for an even longer period of time.

The operation of the lunch box 10 is as follows. In an embodiment of the lunch box 10 that includes the heating device 60, the heating device 60 is first heated, as previously described, if hot food is to be stored in the lunch box 60. The heat producing device 60 is then placed inside the hot compartment 18. The trigger 62 is reset and the timer 64 is set so as to activate the trigger 62 at a predetermined time or at a given delay period after the trigger/timer has been reset. Alternatively, the trigger 62 can be manually activated at any time. As discussed above, the heating device 60 adds heat to the environment in the hot compartment 18 so that hot food stored therein is maintained hot for an even longer period of time. Therefore, the operation of the heating device 60 may be controlled depending on the period of time for which the hot food is to be stored.

Next, food is stored inside the lunch box 10 in the compartments 18, 20. The cover 14 is then placed on the box housing 12. The nozzle at the opening 51 of the vacuum pump 50 is inserted into the opening of the outlet 40. The plunger 52 of the vacuum pump 50 is operated so as to evacuate air from inside the compartments 18, 20. As a result of the lower pressure inside the compartments 18, 20, as compared with outside the lunch box 10, the cover 14 is secured onto the box housing 12. The seal 38 ensures that vacuum is maintained inside the lunch box 10, reducing heat conductivity/loss.

When the food inside the lunch box 10 is to be removed, the vacuum inside the compartments 18, 20 may be released by operating the release valve 42. Now the cover 14 can be lifted and the food removed from the respective compartments 18, 20.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A lunch box for maintaining the temperature of stored food, comprising:

an external box housing defining within itself at least one compartment for storing food therein;

the compartment for storing food having inner wall surfaces, means formed on at least a portion of the inner wall surfaces for substantially preventing contact between food stored in the compartment and the inner wall surfaces of the compartment; and a cover over the housing for enclosing the compartment, whereby transfer of heat between the stored food and the inner wall surfaces of the compartment is substantially eliminated; and further comprising vacuum creating means in fluid communication with the compartment for creating a vacuum in the compartment.

2. The lunch box of claim 1, further comprising a vacuum pump having a barrel and a plunger in operative engagement for creating vacuum upon operation of the plunger inside the barrel; the vacuum pump including a nozzle at one end of the barrel for connecting the vacuum pump with the vacuum creating means.

3. The lunch box of claim 1, wherein the vacuum creating means comprises an outlet in the housing, the outlet having an opening; connecting means in the housing being connected with the opening of the outlet for providing fluid connection between the opening and the inside of the compartment, openings in the compartment connected with an end of the connecting means opposite to the opening of the outlet;

valve means at the opening of the outlet for permitting air to be withdrawn from the opening and for preventing air from passing into the connecting means through the opening of the outlet; and release means in fluid connection with the compartment for allowing air to enter the compartment upon actuation of the release means so as to release vacuum inside the compartment.

4. The lunch box of claim 1, wherein the means formed on the inner wall surfaces of the compartment are formed on an inner bottom wall of the compartment.

5. The lunch box of claim 1, wherein the means formed on the inner wall surfaces of the compartment are formed on an inner bottom wall and inner side walls of the compartment.

6. The lunch box of claim 1, wherein the means formed on the inner wall surfaces of the compartment are selected from the group consisting of continuous ribs, spikes and spherically shaped protrusions.

7. The lunch box of claim 1, further comprising sealing means provided between the cover and the housing, the sealing means forming a tight seal when the cover is releasably secured to the housing by vacuum inside the compartment.

8. The lunch box of claim 7, wherein the sealing means comprises a resilient seal provided at a top rim of the housing to operatively engage an inner surface of the cover when the cover is releasably secured thereon.

9. A lunch box for maintaining the temperature of stored food, comprising:

an external box housing defining within itself at least one compartment for storing food therein;

the compartment for storing food having inner wall surfaces, means formed on at least a portion of the inner wall surfaces for substantially preventing contact between food stored in the compartment and the inner wall surfaces of the compartment;

a cover over the housing for enclosing the compartment; and vacuum creating means in the housing in fluid connection with the inside of the compartment for creating vacuum in the compartment by evacuating substantially all of the air therein, whereby a vacuum is created inside the compartment so as to releasably secure the cover to the housing and to maintain the inside of the compartment below atmospheric pressure.

\* \* \* \* \*

UNITED STATES PATENT AND TRADEMARK OFFICE
CERTIFICATE OF CORRECTION

PATENT NO. : 5,485,921
DATED : January 23, 1996
INVENTOR(S) : Jacob M. Toledano

It is certified that error appears in the above-indentified patent and that said Letters Patent is hereby corrected as shown below:

On the title page, under item [19] and item [75], change "Tolendano" to --Toledano--.

Signed and Sealed this

Fourteenth Day of May, 1996

BRUCE LEHMAN

Attest:

Attesting Officer        Commissioner of Patents and Trademarks